United States Patent [19]

Hiraiwa et al.

[11] Patent Number: 4,531,424
[45] Date of Patent: Jul. 30, 1985

[54] GEAR SHIFT MECHANISM FOR TRANSMISSION

[75] Inventors: Kazuyoshi Hiraiwa, Atsugi; Akio Kawaguchi, Zama, both of Japan

[73] Assignee: Nissan Motor Co., Ltd., Japan

[21] Appl. No.: 428,226

[22] Filed: Sep. 29, 1982

[30] Foreign Application Priority Data

Oct. 26, 1981 [JP] Japan .................. 56-170097

[51] Int. Cl.$^3$ .................. G05G 9/02; B60K 20/02
[52] U.S. Cl. .................. 74/477; 74/473 R; 74/475
[58] Field of Search .................. 74/477, 473 R, 475, 74/476

[56] References Cited

U.S. PATENT DOCUMENTS

| | | | |
|---|---|---|---|
| 1,379,891 | 5/1921 | Aichele | 74/475 |
| 3,987,789 | 10/1976 | Longshore et al. | 74/477 X |
| 4,126,055 | 11/1978 | Forsyth | 74/476 |
| 4,275,614 | 6/1981 | Okubo et al. | 74/476 |
| 4,296,642 | 10/1981 | Schetter | 74/476 X |
| 4,304,144 | 12/1981 | Takahashi | 74/476 X |
| 4,324,150 | 4/1982 | Kawamoto | 74/476 |
| 4,381,682 | 5/1983 | Kudo et al. | 74/476 |
| 4,440,037 | 4/1984 | Foxton et al. | 74/477 X |

FOREIGN PATENT DOCUMENTS

| | | |
|---|---|---|
| 66178 | 12/1982 | European Pat. Off. . |
| 657322 | 5/1935 | Fed. Rep. of Germany ........ 74/475 |
| 2713784 | 6/1978 | Fed. Rep. of Germany . |
| 15878 | 4/1978 | Japan . |
| 247583 | 3/1947 | Switzerland . |

*Primary Examiner*—Allan D. Herrmann
*Assistant Examiner*—Stephen B. Andrews
*Attorney, Agent, or Firm*—Lowe, King, Price & Becker

[57] ABSTRACT

In a gear shift mechanism for a manual transmission, a shift rod is axially moved by a driver's manual input force, and this movement is transmitted to a shifter member for shifting a sliding member in a gear train. The shifter member is a swingable lever having a perforation in which a movable member is received. The movable member is movable in and out of its interlocking position in which the movable member partly projects out of the perforation and engages with a recess formed in the side of the shift rod so that the shifter lever and the shift rod are interlocked. When the movable member is out of its interlocking position, the shift rod can freely move without moving the shifter member, so that the shifter member need not move from end to end of the full stroke of the shift rod. In another embodiment, the shifter member comprises a shifter lever and a bell crank.

7 Claims, 10 Drawing Figures

GEAR SHIFT MECHANISM FOR TRANSMISSION

BACKGROUND OF THE INVENTION

The present invention relates to a gear shift mechanism for a manual transmission.

In a manual transmission, a sliding member, such as a sliding gear or a sliding coupling sleeve, in a gear train is axially moved in and out of mesh with another gear member. Such a shift operation is performed by a gear shift mechanism, which comprises a shift rod axially moved by a driver's manual input force and a shifter member which is moved by the shift rod movement and moves the sliding member in and out of mesh.

If such a shift rod is designed to move only a single sliding member through a single shifter member, it is advantageous to fix the shifter member to the shift rod. If, however, a shift rod moves in one direction to move one sliding member into its shift position through one shifter member and moves in the opposite direction to move another sliding member into its shift position through another shifter member, it is undesirable to fix the both shifter members to the shift rod. If the both shifter members are fixed to the shift rod, one shifter member must move from its neutral position toward the direction opposite to its shift position while the other shifter member is moved toward its shift position. This is disadvantageous to reduction in transmission size because there must be provided enough space for each sliding member to move in both directions from its neutral center.

In view of this, gear shift arrangements in which both the shifter members are not fixed to the shift rod have been proposed. One example of such arrangements is disclosed in Japanese published utility model application, examined publication No. 15878/1978. In this example, one (or both) of the two shifter members is not fixed to the shift rod but slidably mounted on the shift rod. This shift rod has a projecting portion for pushing the non-fixed shifter member from its neutral position to its shift position. There is provided, between the shift rod and this shifter member, an interlocking member which interlocks the shift rod and this shifter member thereby to cause this shifter member to return from its shift position to its neutral position. While the shift rod is moving in the opposite direction to move the other shifter member, the interlocking member is driven out of its interlocking position so that the former shifter member is not moved in the opposite direction by this shift rod movement but held stationary in its neutral position. Thus, the stroke of the shifter member is limited within the distance between its neutral position and its shift position.

In this arrangement, however, in order to hold the interlocking member, there must be formed in the shifter member a hub portion with which the shifter member is slidably mounted on the shift rod and which is long enough in the sliding direction to accommodate the interlocking member. Therefore, the shifter member can not be fabricated by blanking or other inexpensive method, but must be made by casting, forging or welding a main portion and a hub portion of a shifter member, which all increase the cost of the shifter member.

SUMMARY OF THE INVENTION

It is therefore an object of the present invention to provide a gear shift mechanism for a transmission which is small in size and advantageous in manufacturing cost.

It is another object of the present invention to provide a gear shift mechanism for a transmission in which a shift rod, a shifter member and an interlocking member are compactly arranged, and the shifter member can be made by blanking or other inexpensive method.

According to the present invention, a gear shift mechanism for a transmission comprises a shift rod means, first shifter means and interlocking means. The shift rod means comprises a shift rod which is axially movable, in accordance with a movement of a gear shift hand lever, from its neutral position in one axial direction to its first operative position and in the opposite axial direction to its second operative position, and pushing means which is integral with the shift rod. The first shifter means for shifting a first sliding member in a gear train of the transmission to effect a gear shift is swingable on a fulcrum fixed to a case of the transmission from its neutral position in which the first sliding member is held in its neutral position, to its shift position in which the first sliding member is held in its driving position. The first shifter means is caused to swing from its neutral position to its shift position by the pushing means of the shift rod means when the shift rod moves from its neutral position to its first operative position. The interlocking means is movable in and out of its interlocking position and interlocks the shift rod and the first shifter means when it is in its interlocking position. The interlocking means is held in its interlocking position when the first shifter means is away from its neutral position so that the interlocking means causes the first shifter means to swing from its shift position to its neutral position when the shift rod moves from its first operative position to its neutral position. The interlocking means is held out of its interlocking position when the shift rod is between its neutral position and its second operative position.

Preferably, the shift rod means has an interlocking recess formed therein, and the first shifter means has a perforation. The perforation has a first end which is open in one surface of the first shifter means substantially in parallel with a plane in which the first shifter means swings and a second end which is open in the opposite surface. The interlocking means is a movable member which is received in the perforation. When the interlocking means is in its interlocking position, the movable member partly projects out of the perforation and engages with the interlocking recess of the shift rod means thereby to interlocking the first shifter means and the shift rod. The movable member is pushed and held in the interlocking position by a stationary guide surface formed in the transmission case when the first shifter means is away from its neutral position.

DETAILED DESCRIPTION OF THE INVENTION

Figure 1:
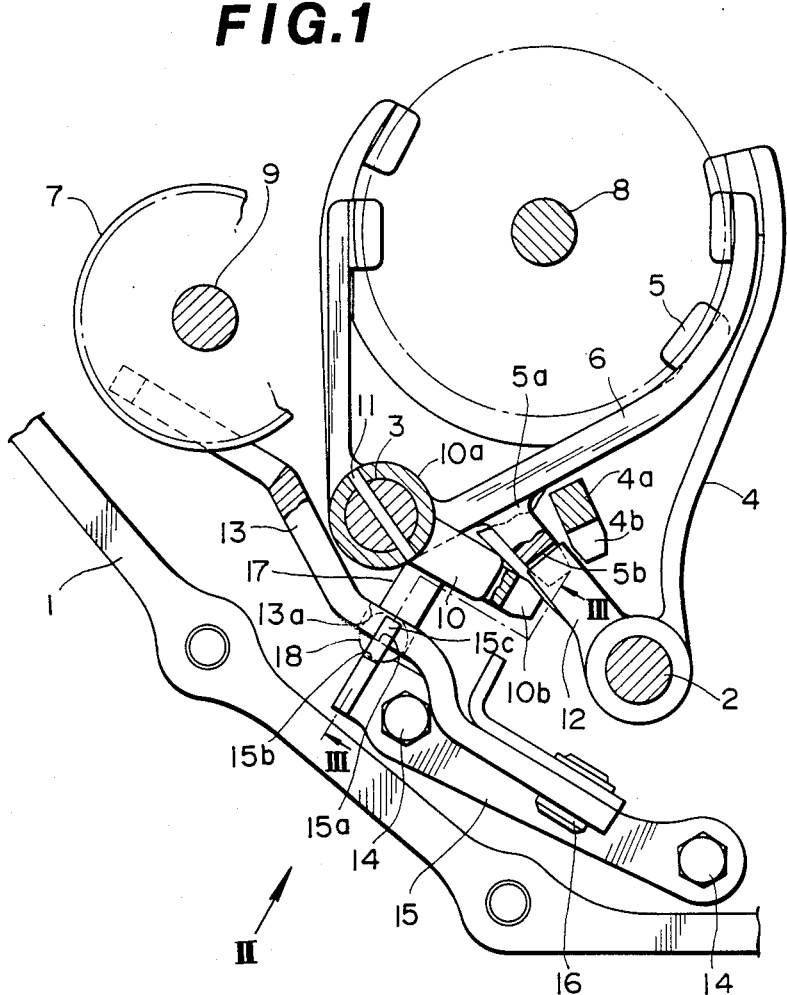
FIG. 1 is a partly broken front elevation of the gear shift mechanism for a transmission according to the present invention.

FIGS. 1 to 5 shows an example in which the gear shift mechanism of the present invention is applied to a gear train for reverse in a manual transmission for a front engine front wheel drive automobile. There are shown a transmission case 1, a control rod 2 for transmitting a driver's manual gear change effort, a shift rod 3, a first and second shift fork 4, a third and fourth shift fork 5, a fifth speed shift fork 6, a reverse idler gear 7, a main shaft 8, and a reverse idler shaft 9.

The control rod 2 is slidably and rotatably mounted on the transmission case 1. One end of the control rod 2 extends outwardly of the transmission case 1 and is connected with a shift lever (not shown). When the driver moves the shift lever to effect a select operation, the control rod 2 rotates. When the driver moves the shift lever to effect a shift operation, the control rod 2 moves longitudinally. The first and second shift fork 4 is slidably and rotatably mounted on the control rod 2. There is formed a shift arm 4a which is integral with the first and second shift fork 4. The shift arm 4a is formed with a recess 4b facing toward the control rod 2. The first and second shift fork 4 has two branches whose ends are received in an outer circumferential groove of a first and second coupling sleeve mounted coaxially with the main shaft 8.

The shift rod 3 is slidably mounted on the transmission case 1. The third and fourth shift fork 5 is slidably mounted on the shift rod 3. There is formed a shift arm 5a which is integral with the third and fourth shift fork 5. The shift arm 5a is formed with a recess 5b facing toward the control rod 2. The three and fourth shift fork 5 has two branches whose ends are received in an outer circumferential groove of a third and fourth coupling sleeve mounted coaxially with the main shaft 8. The fifth speed shift fork 6 is also mounted on the shift rod 3. The fifth speed shift fork 6 is fixed to the shift rod 3, and has two branches whose ends are received in an outer circumferential groove of a fifth speed coupling sleeve mounted coaxially with the main shaft 8.

A shift arm 10 for fifth speed and reverse is fixedly mounted on the shift rod 3. The shift arm 10 has a boss portion 10a which is keyed on the shift rod 3 by a pin 11, and a recess 10b facing toward the control rod 2.

The recesses 4b, 5b and 10b are placed on a circle around the control rod 2. A select arm 12 is fixedly mounted on the control rod 2 and is capable of selectively engaging with any one of these recesses.

Figure 2:
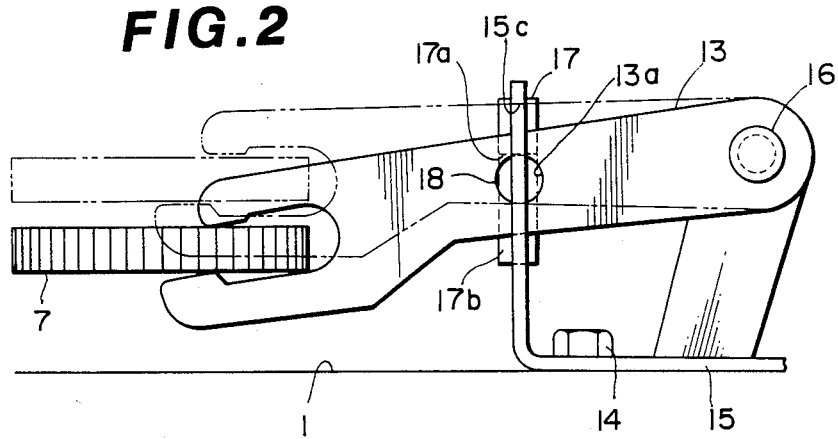
FIG. 2 is a view viewed from the direction of the arrow II of FIG. 1.
Figure 3:
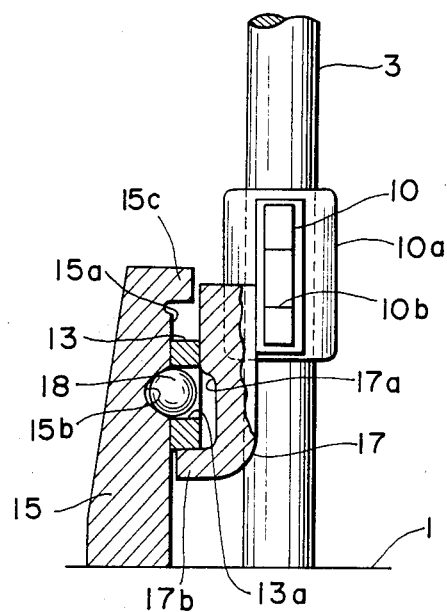
FIG. 3 is a sectional view taken along the line III—III of FIG. 1.

According to the present invention, the reverse idler gear 7 is axially moved by an actuating or shifter lever 13. The actuating lever 13 is pivotally mounted through a pin 16 on a bracket 15 which is fastened to the transmission case 1 by bolts 14. The actuating lever 13 is swingable on the pin 16 in a plane perpendicular to the rotating surface of the reverse idler gear 7. The swingable end of the actuating lever 13 is forked into two branches, between which the reverse idler gear 7 is received, as shown in FIG. 2. During a swing motion, the side face of the actuating lever 13 slides on a guide plane 15a which is formed in the bracket 15 and extends in parallel with the plane in which the actuating lever 13 swings, as shown in FIG. 3. The opposite side face of the actuating lever 13 abuts against a shift block 17 which is integral with the shift arm 10.

Figure 4:
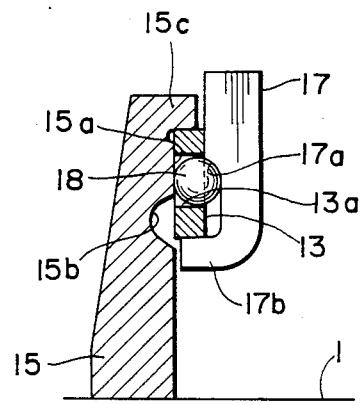
FIGS. 4 and 5 are sectional views similar to FIG. 3 for showing the operations of the gear shift mechanism.
Figure 5:
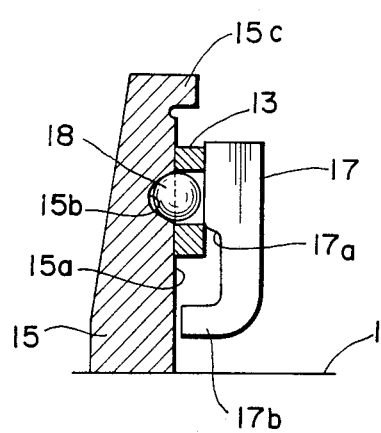

The actuating lever 13 has a perforation 13a bored therethrough from one side face to the opposite side face. In this perforation 13a, a movable member 18 of a ball shape is slidably received. There is formed, in the guide plane 15a of the bracket 15, a recess 15b which matchingly adjoins the perforation 13a of the actuating lever 13 when the actuating lever 13 is in the position shown by a solid line in FIG. 2 in which the reverse idlers gear 7 is moved into its neutral position. The recess 15b has such a size and a depth that the movable member 18 can be partly received therein and, in this state, does not project out of the perforation 13a on the opposite side, as shown in FIG. 3. When the actuating lever 13 is in the position shown by a two-dot chain line in FIG. 2 in which the reverse idler gear is moved into its driving position, the actuating lever 13 abuts against a stopper portion 15c formed in the bracket 15 so that the actuating lever 13 can not swing further, as shown in FIG. 4. In this state, the movable member 18 is driven out of the recess 15b and instead received in a recess 17a formed in the shift block 17, as shown in FIG. 4. The shift block 17 further has an arm portion 17b which abuts against one side of the actuating lever 13 in the state shown in FIG. 4, so that the actuating lever 13 is placed between the stopper portion 15c of the bracket 15 and the arm portion 17b of the shift block 17, as shown in FIG. 4. With the arm portion 17b, the shift block 17 can cause the actuating lever 13 to swing from its neutral position to its shift position.

The shift mechanism of the present invention mentioned above operates as follows: In the state shown in FIGS. 1 to 3, the transmission is in its neutral position in which torque is not transferred to the output shaft. When the driver moves the shift lever in the select direction to rotate the control rod 2 into the position where the select arm 12 comes into engagement with the recess 4b, and then moves the shift lever in the shift direction to move the control rod 2 axially, the first and second shift fork 4 is moved by the select arm 12 in the same direction as the axial movement of the control rod and thus causes the first and second coupling sleeve to slide into either the engaging position of the first gear or the second gear. Similarly, the third and fourth coupling sleeve is caused to slide into the engaging position of either the third gear or the fourth gear by the third and fourth shift fork 5 when the control rod 2 is moved axially with the select arm 12 in engagement with the recess 5b.

When the control rod 2 with the select arm 12 in engagement with the recess 10b is moved axially toward the reverse position, the shift arm 10 moves upward in FIG. 3. During this upward movement, the shift block 17 which is integral with the shift arm 10 moves the actuating lever 13 with the arm portion 17b from the position shown in FIG. 3 (that is, the position shown by the solid line in FIG. 2) to the position where the actuating lever 13 abuts against the stopper portion 15c of the bracket 15 as shown in FIG. 4 (that is, the position shown by the two-dot chain line in FIG. 2). In this case, the movable member 18 can move out of the recess 15b and into the recess 17a, so that the movable member 18 does not prevent the swing motion of the actuating lever 13 in this direction. This swing motion of the actuating lever 13 causes the reverse idler gear 7 to shift axially from the position shown by the solid line in FIG. 2 to the reverse driving position shown by the two-dot chain line.

When the driver moves the shift lever from the reverse position to the neutral position, the shift arm 10 and the shift block 17 move in the direction reverse to what has been mentioned above. In this case, the shift block 17 moves the actuating lever 13 downward in FIG. 4 through the movable member 18 because the movable member 18 is held engaged with the recess 17a by the guide plane 15a. Thus, the reverse idler gear 7 can be shifted from the position of the two-dot chain line to the position of the solid line in FIG. 2.

When the shift lever, held in the select position where the select arm 12 is in engagement with the recess 10b, is moved from the neutral position to the fifth gear position opposite to the reverse position, the shift arm 10 is moved downward in FIG. 3 from the position shown in FIG. 3. During this movement, the shift block 17 integral with the shift arm 10 tries to move the actuating lever 13 downward by friction, but the movable member 18, being held engaged with the recess 15b, prevents a downward movement of the actuating lever 13. Therefore, in this case, the actuating lever 13 does not swing but holds the reverse idler gear 7 in the neutral position shown by the solid line in FIG. 2. On the other hand, the shift rod 3, which is fixed with the shift arm 10, is moved downwardly in FIG. 3 by the downward movement of the shift arm 10, so that the fifth gear shift fork 6, which is with the shift rod 3, shifts the fifth speed cbupling sleeve from its neutral position to its fifth gear position.

Thus, the sliding member, that is, the reverse idler gear in this example, sweeps only the volume between its driving position and its neutral position, and does not move to the opposite direction from its neutral position, so that the transmission can be made compact. Moreover, the shifter member, i.e. the actuating lever 13, can be inexpensively made by blanking.

Figure 6:
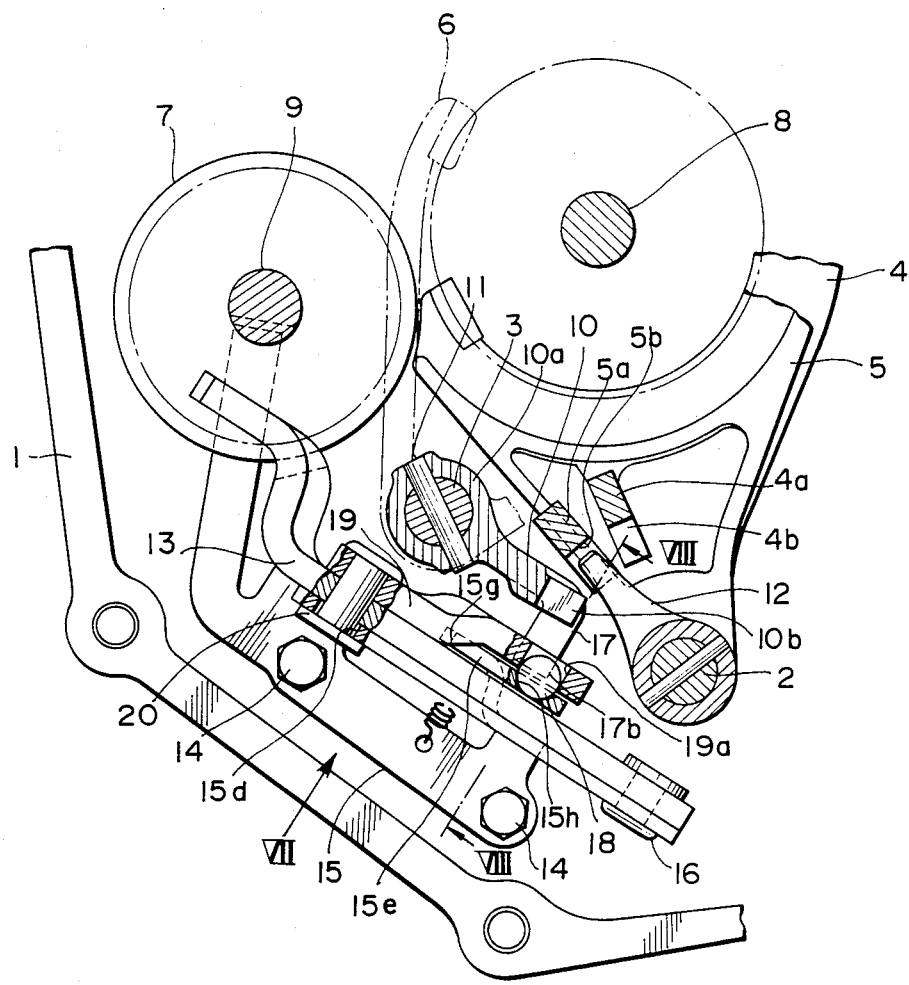
FIG. 6 is a partly broken front elevation of another embodiment of the gear shift mechanism according to the present invention.

In the above mentioned embodiment, the shift block 17 directly moves the actuating lever 13 to shift the reverse idler gear 7. However, the present invention is also applicable to the arrangement in which the shift block 17 moves the actuating lever 13 through another member which is interposed between the shift block 17 and the actuating lever 13 for preventing a self disengagement of the reverse idler gear 7. Such an arrangement is shown in FIGS. 6 to 10, in which the same reference numerals as used in FIGS. 1 to 5 are used to designate similar parts. The transmission shown in FIGS. 6 to 10 is a transmission for a front engine front wheel drive vehicle, and almost the same as the transmission of the preceding embodiment. As shown in FIG. 6, however, the third and fourth shift fork 5 is slidably and rotatably mounted on the control rod 2.

In this embodiment of FIGS. 6 to 10, the shifter for the reverse idler gear 7 comprises an actuating lever 13 and an intermediate lever 19 which is placed side by side with the actuating lever 13 and pivoted on a middle portion of the actuating lever 13 by a pin 20. The pin 20 also serves as a stopper for limiting the swing motion of the actuating lever 13 between both limits. To this end, the pin 20 is inserted through a slot 15d which is formed in the bracket 15 and has a shape of an arc of a circle around the pin 16. The slot 15d has such a length that the actuating lever 13 can swing between the position shown by a solid line in FIG. 7 where the reverse idler gear 7 is brought into its neutral position and the position shown by a two-dot chain line in FIG. 7 where the reverse idler gear 7 is in its driving position, but the actuating lever 13 cannot swing beyond both the positions.

The intermediate lever 19 in this embodiment is a bell crank having two arms. A first arm of the intermediate lever 19 has a circular end portion. A perforation 19a is bored centrally in the circular end portion of the first arm. The perforation 19a crosses the swing plane in which the intermediate lever 19 swings, and receives the movable member 18 of a ball shape. A second arm of the intermediate lever 19 is formed, in the end portion, with a claw portion 19b facing toward the first arm and an abutting portion 19c projecting toward the opposite direction and facing to a shoulder portion 13b of the actuating lever 13.

Figure 7:
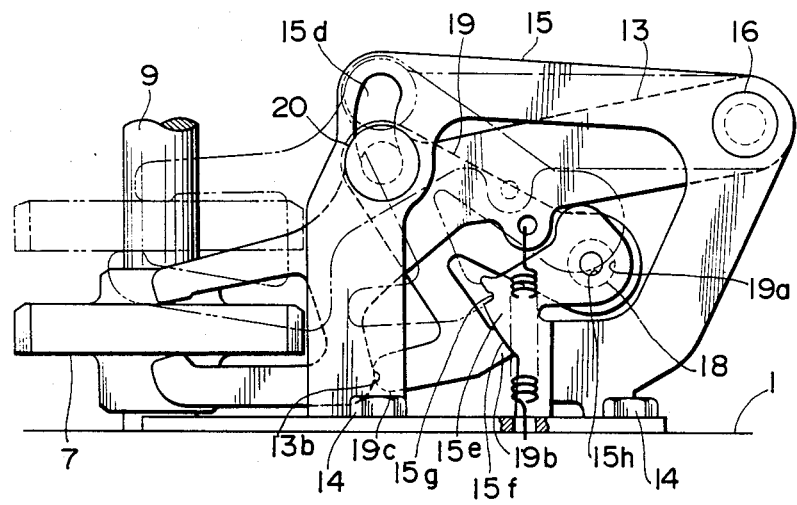
FIG. 7 is a view viewed from the direction of the arrow VII of FIG. 6.

The bracket 15 has an extended portion 15e which extends curvedly from the main portion of the bracket 15, as shown in FIG. 6. One side of the extended portion abuts on the claw portion 19b of the intermediate lever 19, and formed with a guide surface 15f for guiding the claw portion 19b and a recess 15g to be engaged with the claw portion 19b as shown in FIG. 7. When the claw portion 19b is sliding on the guide surface 15f, the abutting portion 19c of the intermediate lever 19 is in contact with the shoulder portion 13b of the actuating lever 13. When the claw portion 19b falls in the recess 15g, the abutting portion 19c is spaced from the shoulder portion 13b at a distance equal to the depth of the recess 15g. The guide surface 15f is curved in an arc shape as shown in FIG. 7.

Figure 8:
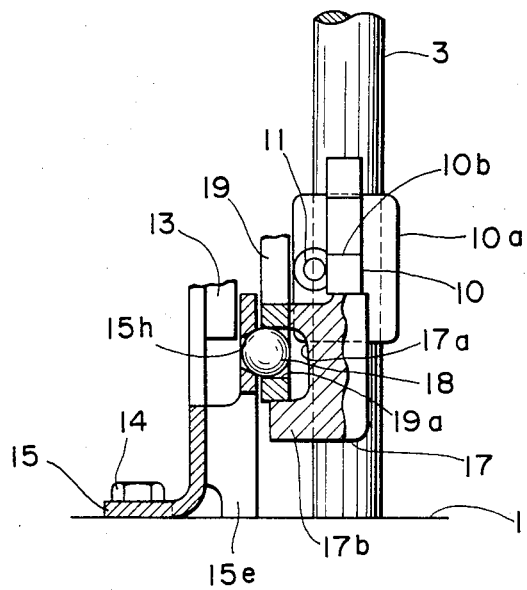
FIG. 8 is a sectional view taken along the line VIII—VIII of FIG. 6.

The extended portion 15e of the bracket 15 has a portion lying side by side with the circular end portion of the first arm of the intermediate lever 19, and a recess 15h which is formed in that portion and adjoins one end of the perforation 19a. When the movable member 18 projects from one open end of the perforation 19a and is seated in the recess 15h, the movable member 18 does not project from the other open end of the perforation 19a, as shown in FIG. 8. The perforation 19a is placed between the extended portion 15e of the bracket 15 and the shift block 17. As in the preceding embodiment, the shift block 17 has a recess 17a for receiving the movable member 18 and an arm portion 17b for pushing the intermediate lever 19.

The thus constructed transmission is shifted into the forward speeds in the same manner as in the preceding embodiment. The shift operation to reverse in this transmission is as follows: When the driver selects the position where the select arm 12 is in engagement with the recess 10b and then shifts the shift lever to the reverse position, the shift arm 10 moves upwards from its neutral position shown in FIG. 8. During this movement, the shift block 17 integral with the shift arm 10 lifts up the circular end portion of the intermediate lever 19 with the arm portion 17b. In the state of FIG. 8, the actuating lever 13 and the intermediate lever 19 hold the positions shown by solid lines in FIG. 7, where the claw portion 19b and the abutting portion 19c of the intermediate lever 19 are put between the shoulder portion 13b of the actuating lever 13 and the guide plane 15f of the bracket 15. Therefore, the lifting force applied by the arm portion 17b of the shift block 17 on the circular end portion of the intermediate lever 19 does not cause a relative rotation of the intermediate lever 19 with respect to the actuating lever 13, but this lifting force is transmitted to the actuating lever 13 through the intermediate lever 19, so that the actuating lever 13 swings on the pin 16 from the position of the solid line to the position of the two-dot chain line in FIG. 7. This swing motion of the actuating lever 13 causes the reverse idler gear 7 to shift from its neutral position shown by a solid line to its driving position shown by a two-dot chain line in FIG. 7. In this state, the intermediate lever 19 rotates on the pin 20 with respect to the actuating lever 13 by the above mentioned lifting force, and the claw portion 19b of the intermediate lever 19 comes into engagement with the recess 15g. With this engagement between the claw portion 19b and the recess 15g, an undesired self disengagement of the reverse idler gear is prevented, because, even if a force trying to move the reverse idler gear 7 from its driving position of the two-dot chain line to its neutral position of the solid line in FIG. 7 is applied to the reverse idler gear 7, it is transmitted through the actuating lever 13, the intermediate lever 19, and the claw portion 19b, to the recess 15g of the bracket 15, and is received by the bracket 15 and the transmission case 1.

Figures 9, 10:
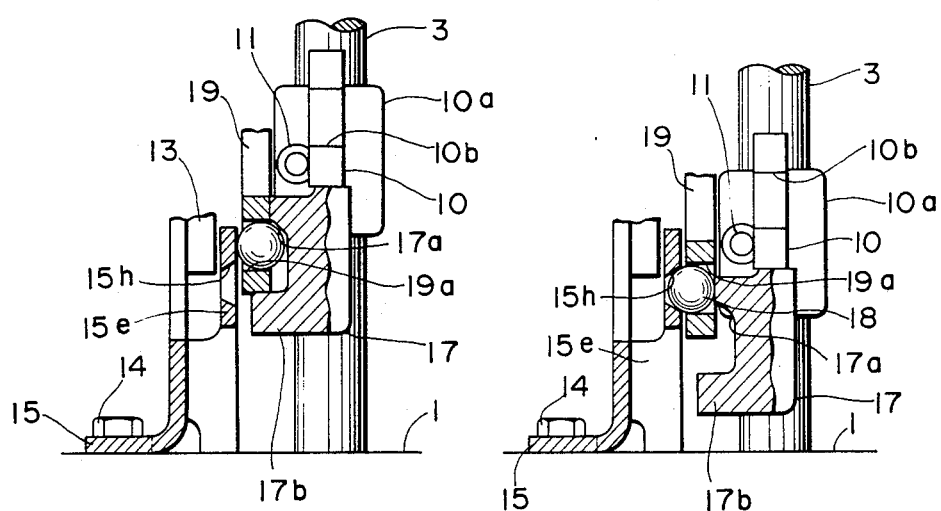
FIGS. 9 and 10 are sectional views similar to FIG. 8 for showing the operations of the gear shift mechanism shown in FIGS. 6 to 8.

During the above mentioned shift operation, the shift block 17 moves together with the intermediate lever from the position shown in FIG. 8 to the position shown in FIG. 9. This movement of the shift block 7 is not prevented because the movable member 18 driven out of the recess 15h can enter the recess 17a of the shift block 17.

When the driver moves the shift lever from the reverse position to the neutral position, the shift block 17 moves downward in FIG. 9. In this case, the movable member 18 is held in the recess 17a of the shift block 17, so that the shift block 17 moves the circular end portion of the intermediate lever 19 downward through the movable member 18 from the position of FIG. 9 to the position of FIG. 8. This causes the intermediate lever 19 placed in the position of the two-dot line in FIG. 7 to rotate clockwise on the pin 20 with respect to the actuating lever 13 as far as the abutting portion 19c abuts against the shoulder portion 13b, and the claw portion 19b moves away from the recess 15g. After that, the rotation of the intermediate lever 19 relative to the actuating lever 13 is prevented by the shoulder portion 13b of the actuation lever 13, and instead the intermediate lever 19 swings on the pin 16 integrally with the actuating lever 13 and returns to the position of the solid line in FIG. 7. In this way, the reverse idler gear 7 is shifted from the driving position shown by the two-dot chain line to the neutral position shown by the solid line in FIG. 7, and thus the transmission is shifted to the neutral position.

In the same select position where the select arm 12 is in engagement with the recess 10b, a shift operation from the neutral position to the fifth speed position opposite to the reverse position causes the shift arm 10 and the shift block 17 to move downward from the position shown in FIG. 8. In this case, the shift block 17 tries to move the circular end portion of the intermediate lever 19 together. However, as shown in FIG. 10, the movable member 18 is held in engagement with the recess 15h, so that the intermediate lever 19 cannot move and accordingly holds the reverse idler gear 7 in the neutral position shown by the solid line in FIG. 7. On the other hand, the downward movement of the shift arm 10 causes the shift rod 3 and the shift arm 10 to move together, and this causes the fifth speed shift fork 6 fixedly mounted on the shift rod 3 to move to its driving position so that the transmission is shifted into the fifth speed.

Although there is provided additionally the intermediate lever 19 for preventing a self disengagement of the sliding member, the space for the sliding member, i.e. the reverse idler gear, is still maintained at a minimum, as in the preceding embodiment. Additionally, the actuating lever 13 and the intermediate lever 19 constituting the shifter means are both made inexpensively by blanking of sheet metals.

What is claimed is:

1. A gear shift mechanism for a transmission comprising:

shift rod means comprising a shift rod which is axially movable, in accordance with a movement of a gear shift hand lever, from its neutral position in one axial direction to its first operative position and in the opposite direction to its second operative position, and pushing means integral with said shift rod, first shifter means for shifting a first sliding member in a gear train of the transmission to effect a gear shift, said first shifter means being swingable on a fulcrum fixed to a case of the transmission from its neutral position in which the first sliding member is held in its neutral position, to its shift position in which the first sliding member is held in its driving position, said first shifter means being caused to swing from its neutral position to its shift position by said pushing means when said shift rod moves from its neutral position to its first operative position, and interlocking means which is movable in and out of its interlocking position and interlocks said shift rod and said first shifter means when it is in its interlocking position, said interlocking means being held in its interlocking position when said first shifter means is away from its neutral position so that said interlocking means causes said first shifter means to swing from its shift position to its neutral position when said shift rod moves from its first operative position to its neutral position, and said interlocking means being held out of its interlocking position when said shift rod is between its neutral position and its second operative position.

2. A gear shift mechanism according to claim 1, wherein said shift rod means has an interlocking recess formed therein, said first shifter means having a perforation having a first end open in one surface substantially in parallel with a plane in which said first shifter means swings and a second end open in the opposite surface, said interlocking means being a movable member which is received in said perforation and movable into said interlocking position, in which said movable member partly projects out of said perforation and engages with said interlocking recess of said shift rod means, said movable member being pushed and held in said interlocking position by a stationary guide surface formed in the transmission case when said first shifter means is away from its neutral position.

3. A gear shift mechanism according to claim 2, wherein said pushing means is a shift block which is fixed to said shift rod and has a moving guide surface facing toward said stationary guide surface of the transmission case and an arm portion for pushing said first shifter means to cause it to swing from its neutral position to its shift position, said perforation being placed between said stationary guide surface and said moving guide surface with the first open end facing said moving guide surface and the second open end facing said stationary guide surface, said stationary guide surface being formed with an escape recess, said interlocking recess being formed in said moving guide surface, said movable member being allowed to escape from engagement with said interlocking recess and into engagement with said escape recess when said first shifter means is in its neutral position, said moving guide surface pushing and holding said movable member in engagement with said escape recess when said shift rod is away from its neutral position toward its second operative position.

4. A gear shift mechanism according to claim 3, further comprising second shifter means for shifting a second sliding member in a gear train of the transmission to effect another gear shift, said second shifter means being moved from its neutral position to its shift position by an axial movement of said shift rod from its neutral position to its second operative position.

5. A gear shift mechanism according to claim 4, wherein said first shifter means is a lever having one end pivoted on the fulcrum and a swingable end for shifting the first sliding member, said perforation being formed in the intermediate portion of said lever between the pivoted end and the swingable end.

6. A gear shift mechanism according to claim 4, wherein said first shifter means comprises:

a shifter lever having one end pivoted on the transmission case and a swingable end engaged with the first sliding member, and a bell crank centrally pivoted on said shifter lever at a position intermediate between the pivoted end and the swingable end and swingable in parallel with a plane in which said shifter lever swings, said bell crank having a first arm which is formed with said perforation and receives the motion of said shift block, and a second arm which slides on a guideway formed in a bracket fixed to the transmission case, said second arm being guided by said guideway in such a manner that said bell crank swings integrally with said shifter lever with respect to the transmission case without swinging with respect to said shifter lever, said guideway having at one end a recessed portion which engages with said second arm when said first shifter means is in its shift position and thereby prevents said first shifter means to swing away from its shift position.

7. A gear shift mechanism according to claim 6, wherein said second arm is fitted between said guideway and a shoulder portion formed in said shifter lever as long as said second arm is sliding on said guideway, said second arm being capable of swinging with respect to said shifter lever away from said shoulder portion and falling in said recessed portion when said first shifter means is in its shift position.

* * * * *